(12) United States Patent
Koevoets et al.

(10) Patent No.: US 7,226,963 B2
(45) Date of Patent: *Jun. 5, 2007

(54) CONDUCTIVE POLYPHENYLENE ETHER-POLYAMIDE BLEND

(75) Inventors: Christiaan H. Koevoets, Roosendall (NL); Johannes Matthijssen, Wouw (NL)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/249,929

(22) Filed: May 20, 2003

(65) Prior Publication Data

US 2003/0166762 A1 Sep. 4, 2003

Related U.S. Application Data

(63) Continuation of application No. 10/064,321, filed on Jul. 2, 2002, now Pat. No. 6,593,411, which is a continuation of application No. 09/438,998, filed on Nov. 12, 1999, now Pat. No. 6,469,093.

(51) Int. Cl.
*C08J 3/20* (2006.01)
*C08J 3/22* (2006.01)

(52) U.S. Cl. .................. 523/351; 524/451; 524/495; 524/496

(58) Field of Classification Search ............. 524/495, 524/496, 451; 523/351
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 5/1943 | Hanford | |
| 2,512,606 A | 6/1950 | Bolton et al. | |
| 3,078,254 A | 2/1963 | Zelinski et al. | |
| 3,265,765 A | 8/1966 | Holden et al. | |
| 3,297,793 A | 1/1967 | Dollinge | |
| 3,379,792 A | 4/1968 | Finholt | |
| 3,402,159 A | 9/1968 | Hsieh | |
| 3,428,699 A | 2/1969 | Schleimer | |
| 3,594,452 A | 7/1971 | De La Mare et al. | |
| 3,756,999 A | 9/1973 | Stetter et al. | |
| 3,822,227 A | 7/1974 | Hermann et al. | |
| 3,876,721 A | 4/1975 | Yasui et al. | |
| 4,054,612 A | 10/1977 | Yagi et al. | |
| 4,315,086 A | 2/1982 | Ueno et al. | |
| 4,600,741 A | 7/1986 | Aycock et al. | |
| 4,642,358 A | 2/1987 | Aycock et al. | |
| 4,659,760 A | 4/1987 | van der Meer | |
| 4,732,938 A | 3/1988 | Grant et al. | |
| 4,822,836 A | 4/1989 | Wroczynski | |
| 4,826,933 A | 5/1989 | Grant et al. | |
| 4,866,114 A | 9/1989 | Taubitz et al. | |
| 4,927,894 A | 5/1990 | Brown | |
| 4,980,424 A | 12/1990 | Sivavec | |
| 5,041,504 A | 8/1991 | Brown et al. | |
| 5,115,042 A | 5/1992 | Khouri et al. | |
| 5,124,391 A | 6/1992 | Muehlbach et al. | |
| 5,244,973 A | 9/1993 | Sakazume et al. | |
| 5,284,681 A * | 2/1994 | Shinonaga et al. | 427/316 |
| 5,304,593 A | 4/1994 | Nishio et al. | |
| 5,523,342 A | 6/1996 | Nagaoka et al. | |
| 5,534,600 A * | 7/1996 | Bailly et al. | 525/397 |
| 5,539,050 A | 7/1996 | Fujii et al. | |
| 5,559,185 A | 9/1996 | Abe et al. | |
| 5,591,382 A | 1/1997 | Nahass et al. | |
| 5,643,990 A * | 7/1997 | Uehara et al. | 524/496 |
| 5,843,340 A * | 12/1998 | Silvi et al. | 252/511 |
| 5,876,647 A * | 3/1999 | Makise et al. | 264/105 |
| 5,886,094 A | 3/1999 | Sanada et al. | |
| 6,107,415 A | 8/2000 | Silvi et al. | |
| 6,150,473 A | 11/2000 | Brown et al. | |
| 6,166,115 A * | 12/2000 | Landa | 524/115 |
| 6,316,551 B1 | 11/2001 | Silvi et al. | |
| 6,352,782 B2 | 3/2002 | Yeager et al. | |
| 6,353,050 B1 * | 3/2002 | Bastiaens et al. | 524/538 |
| 6,362,263 B1 | 3/2002 | Brown et al. | |
| 6,469,093 B1 | 10/2002 | Koevoets et al. | |
| 6,486,255 B2 * | 11/2002 | Koevoets et al. | 524/451 |
| 6,489,404 B2 | 12/2002 | Bolluijt et al. | |
| 6,500,895 B1 * | 12/2002 | Bastiaens et al. | 524/538 |
| 6,593,411 B2 | 7/2003 | Koevoets et al. | |

(Continued)

FOREIGN PATENT DOCUMENTS

EP 0 562 178 A1 9/1993

(Continued)

*Primary Examiner*—Tae H. Yoon

(57) ABSTRACT

The present invention relates to a thermoplastic resin composition and a method for making the same. The composition comprises the reaction product of about 10 wt % to about 50 wt % polyphenylene ether, about 35 wt % to about 65 wt % polyamide, preferably about 0.4 wt % to about 3.0 wt % carbon fibrils, and optionally about 5 wt % to about 40 wt % talc, up to about 10 wt % compatibilizing agent and up to about 20 wt % impact modifier. The method comprises forming a carbon masterbatch with polyamide and introducing the masterbatch and the polyamide subsequent to compounding the polyphenylene ether with a compatibilizing agent.

25 Claims, 2 Drawing Sheets

U.S. PATENT DOCUMENTS

| | | |
|---|---|---|
| 6,599,446 B1 * | 7/2003 | Todt et al. ............... 252/511 |
| 6,608,133 B2 * | 8/2003 | Kurasawa et al. .......... 524/496 |
| 2001/0031831 A1 | 10/2001 | Miyoshi et al. |
| 2001/0053450 A1 | 12/2001 | Yeager et al. |
| 2002/0055596 A1 | 5/2002 | Bollujit et al. |
| 2002/0115778 A1 | 8/2002 | Koevoets et al. |
| 2003/0023006 A1 | 1/2003 | Patel |

FOREIGN PATENT DOCUMENTS

| | | |
|---|---|---|
| EP | 0 685 527 A1 | 6/1995 |
| GB | 1264741 | 2/1972 |
| WO | WO 94/23433 | 10/1994 |

* cited by examiner

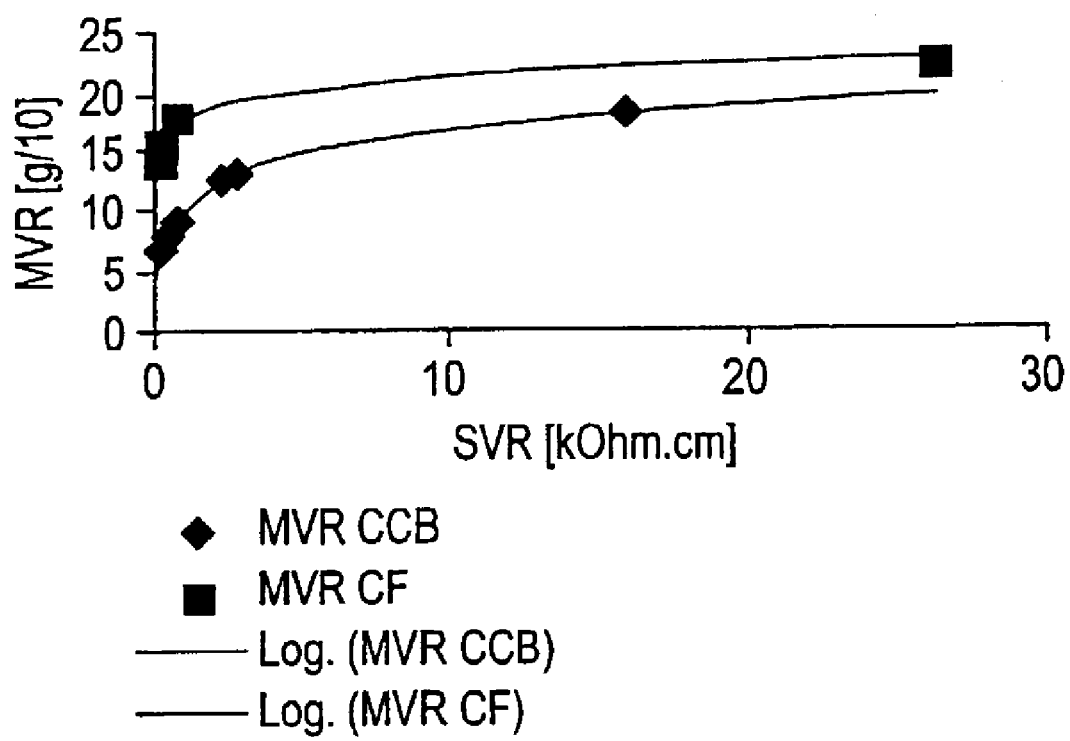

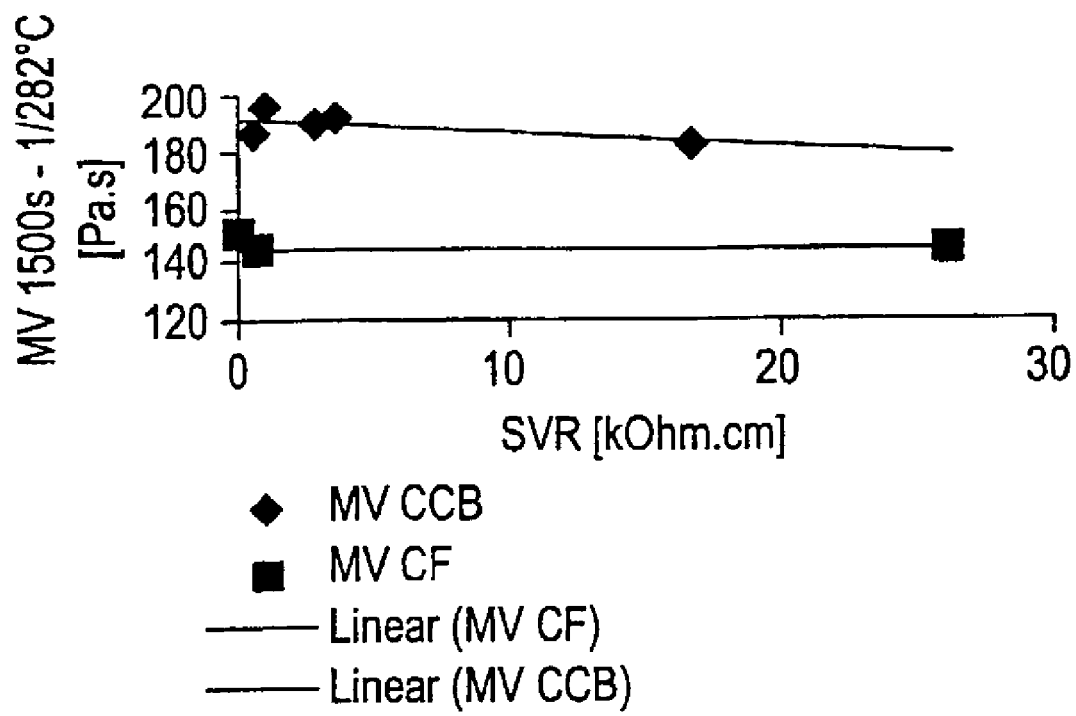

CONDUCTIVE POLYPHENYLENE ETHER-POLYAMIDE BLEND

CROSS REFERENCE TO RELATED APPLICATIONS

This application is a continuation application of U.S. patent application Ser. No. 10/064,321 filed Jul. 2, 2002, which is a continuation application of U.S. patent application Ser. No. 09/438,998 filed on Nov. 12 1999, now U.S. Pat. No. 6,469,093 the contents of which are hereby incorporated by reference in their entirety.

BACKGROUND OF INVENTION

1. Field of the Invention

The present invention relates to a conductive thermoplastic resin, and especially relates to a conductive polyphenylene ether-polyamide blend.

2. Brief Description of the Related Art

Poly(phenylene ether) resins (referred to hereafter as "PPE") are commercially attractive materials because of their unique combination of physical, chemical, and electrical properties. Furthermore, the combination of these resins with polyamide (PA) resins into compatibilized blends results in additional overall properties such as chemical resistance, high strength, and high flow. Examples of such compatibilized blends can be found in U.S. Pat. Nos. 4,315,086 (Ueno, et al); 4,659,760 (van der Meer); and 4,732,938 (Grant, et al). The properties of these blends can be further enhanced by the addition of various additives such as impact modifiers, flame retardants, light stabilizers, processing stabilizers, heat stabilizers, antioxidants and fillers.

The physical properties of PPE/polyamide blends make them attractive for a variety of end-use articles, for example, in the automotive market, for various exterior components. Dimensional behavior of these components is critical due to the differences in coefficient of thermal expansion, which can be improved by adding fillers (organic/inorganic) as known to those skilled in the art.

U.S. Pat. No. 5,591,382 to Nahass et al., discloses a polymeric composition comprising carbon fibrils, at least a portion of which are in the form of aggregates, wherein, as measured on an area basis, substantially all of the aggregates are less than about 35 î¼ in diameter. The polymeric composition is prepared by combining the carbon fibrils with a polymeric material, mixing the combination to distribute the fibrils in the polymeric material and applying shear to the combination to break down the aggregates until substantially all of the aggregates are less than about 35 î¼ in diameter. Nahass et al. teach the use of a lower loading of the conductive fibrils in order to achieve a certain conductivity while retaining better impact performance compared to carbon black or carbon fibers.

Although numerous PPE/polyamide compositions having a variety of properties are available, compositions having alternative properties are continuously sought in the industry.

BRIEF SUMMARY OF INVENTION

The present invention relates to a thermoplastic resin composition and a method for making the same. The composition comprises: about 10 weight percent (wt %) to about 50 wt % polyphenylene ether, about 35 wt % to about 65 wt % polyamide, about 5 wt % to about 40 wt % talc, and about 0.4 wt % to about 3.0 wt % carbon.

The method comprises: forming a talc masterbatch comprising about 40 wt % to about 50 wt % talc and about 50 wt % to about 60 wt % polyamide; forming a carbon masterbatch comprising about 10 wt % to about 30 wt % carbon and about 70 wt % to about 90 wt % polyamide; introducing polyphenylene ether and a compatibilizer to an extruder; maintaining the extruder at a sufficient temperature to melt the polyphenylene ether; introducing polyamide, said carbon masterbatch to the extruder at a downstream port; forming a thermoplastic composition comprising the reaction product of about 10 weight percent (wt %) to about 50 wt % polyphenylene ether; about 35 wt % to about 65 wt % polyamide; and about 0.4 wt % to about 3.0 wt % carbon.

BRIEF DESCRIPTION OF DRAWINGS

Referring now to the drawings which are meant to be illustrative, not limiting:

FIG. 1 is a graph of melt volume rate (MVR) as a function of specific volume resistivity (SVR).

FIG. 2 is a graph of melt viscosity (MV) as a function of specific volume resistivity (SVR).

DETAILED DESCRIPTION

The thermoplastic composition of the present invention comprises both the mixture and reaction product(s) of: polyphenylene ether, polyamide, talc, and carbon fibrils, along with, optionally, compatibilizers, impact modifiers and various additives. The thermoplastic composition can comprise about 10 weight percent (wt %) to about 50 wt % polyphenylene ether, about 35 wt % to about 65 wt % polyamide, about 5 wt % to about 40 wt % talc, and about 0.4 wt % to about 3.0 wt % carbon (preferably in the form of fibrils), with about 15 wt % to about 30 wt % polyphenylene ether, about 45 wt % to about 55 wt % polyamide, about 15 wt % to about 25 wt % talc, about 0.6 wt % to about 1.5 wt % carbon fibrils, and optionally from 0 to about 10 wt % compatibilizer and from 0 to about 20 wt % impact modifier, preferred, (balance additives) based on the total weight of the composition.

Poly(Arylene) Ether

Although all conventional poly(arylene ether)s can be employed with the present invention, polyphenylene ethers ("PPE") are preferred. Polyphenylene ethers are known polymers comprising a plurality of structural units of the formula (I):

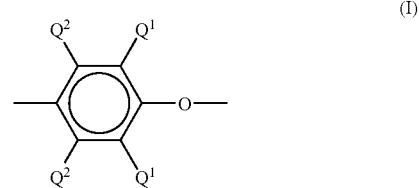

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, halo alkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The polyphenylene ether generally has a number average molecular weight within the range of about 3,000–40,000 and a weight average molecular weight within the range of about 20,000–80,000, as determined by gel permeation chromatography. The poly(arylene ether) generally has an intrinsic viscosity often between about 0.10–0.60 deciliters per gram (dl/g), preferably in the range of about 0.29–0.48 dl/g, all as measured in chloroform at 25Â° C. It is also possible to utilize a high intrinsic viscosity poly (arylene ether) and a low intrinsic viscosity poly(arylene ether) in combination. Determining an exact ratio, when two intrinsic viscosities are used, Will depend somewhat on the exact intrinsic viscosities of the poly(arylene ether) used and the ultimate physical properties that are desired.

The polyphenylene ether are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful polyphenylene ether for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ether contemplated for use in the present invention include all those presently known, irrespective of variations in structural units or ancillary chemical features.

Polyamide

The polyamide resins useful in the practice of the present invention are a generic family of resins known as nylons, characterized by the presence of an amide group (—C(O)NH—). Nylon-6 and nylon-6,6 are the generally preferred polyamides and are available from a variety of commercial sources. Other polyamides, however, such as nylon-4,6, nylon-12, nylon-6,10, nylon 6,9, nylon 6/6T and nylon 6,6/6T with triamine contents below about 0.5 weight percent, as well as others, such as the amorphous nylons may be useful for particular polyphenylene ether-polyamide applications. Mixtures of various polyamides, as well as various polyamide copolymers, are also useful. The most preferred polyamide for the blends of the present invention is polyamide-6,6.

The polyamides can be obtained by a number of well known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylene diamine, di-(4-aminophenyl)methane, di-(4-aminocyclohexyl)methane; 2,2-di-(4-aminophenyl) propane, 2,2-di-(4-aminocyclohexyl)propane, among others. Copolymers of caprolactam with diacids and diamines are also useful.

Polyamides having viscosity of up to about 400 ml/g can be used, with a viscosity of about 90 to about 350 ml/g preferred, and about 110 to about 240 ml/g especially preferred, as measured in a 0.5 wt % solution in 96 wt % sulphuric acid in accordance with ISO 307.

Fillers

Preferably a sufficient amount of filler is employed to reduce the coefficient of thermal expansion, improve dimensional behavior (flow as well as cross flow) of the composition without having too much of a negative effect on surface finish, flow and impact. Although mica, talc, clay, glass fibers, and other fillers can be employed, talc is preferably employed as at least one of the filler(s) due to better surface finish and reduced effect on impact strength compared to glass fibers (for example), and greater reduction in the coefficient of thermal expansion compared to clays (for example). Although from 0 to about 50 wt % filler can be used, based on the total weight of the thermoplastic composition, about 5 to about 40% filler is preferred, with about 15 wt % to about 25 wt % especially preferred. The talc is preferably a Mg-silicate with an average particle size of about 3.0 microns to about 5.0 microns, with an average size of about 4.0 microns to about 5.0 microns preferred; with particle size distribution of greater than about 90% under about 20 microns, with greater than about 95% under about 20 microns preferred, and about 98% or greater under 20 microns especially preferred.

Conductive Material

The conductive material can be any material which does not significantly adversely effect the physical characteristics of the thermoplastic composition, such as carbon and the like. The carbon can be in the form of carbon black ("CCB"; e.g. Ketjenblack EC 600 JD available from AKZO, Deventer, The Netherlands), and carbon fibrils ("CF"), (e.g., BN fibrils available from Hyperion Catalysis International, Cambridge, Mass. 01921 USA), with carbon fibrils preferred, such as those disclosed in patent WO/94/23433. Carbon fibrils are typically in the form of vermicular tubes with graphitic outer layers disposed substantially concentrically about the cylindrical axis of the fibril. Preferably, the fibrils are substantially free of a pyrolytically deposited thermal carbon overcoat. Carbon fibrils have a length-to-diameter ratio of at least 5, and more preferably at least 100. Even more preferred are fibrils whose length-to-diameter ratio is at least 1,000. The wall thickness of the fibrils is about 0.1 to 0.4 times the fibril external diameter, which is preferably between 3.5 and 75 nanometers.

Compatibilizing Agent

In blends of the present invention, a compatibilizing agent should be employed in the preparation of the composition in amounts up to about 25 wt %, with 0 to about 10 wt % preferred, and about 0.4 to about 3.0 wt % especially preferred, based on the total weight of the composition. The two-fold purpose for using compatibilizing agents is to improve, in general, the physical properties of the polyphenylene ether-polyamide resin blend, as well as to enable the use of a greater proportion of the polyamide component. When used herein, the expression "compatibilizing agent" refers to those polyfunctional compounds which interact with either the polyphenylene ether, the polyamide resin, or both. This interaction may be chemical (e.g. grafting) or physical (e.g. affecting the surface characteristics of the dispersed phases). In either instance the resulting polyphenylene ether-polyamide composition appears to exhibit improved compatibility, particularly as evidenced by enhanced impact strength, mold knit line strength and/or elongation. As used herein, the expression "compatibilized polyphenylene ether-polyamide base resin" refers to those compositions which have been physically or chemically compatibilized with an agent as discussed above, as well as those compositions which are physically compatible without such agents, as taught in U.S. Pat. No. 3,379,792.

Examples of the various compatibilizing agents that may be employed in the practice of the present invention include: a) liquid diene polymers, b) epoxy compounds, c) oxidized polyolefin wax, d) quinones, e) organosilane compounds, f) polyfunctional compounds and functionalized polyphenylene ether as described obtained by reacting one or more of the previously mentioned compatibilizing agents with polyphenylene ether hereinafter.

Liquid diene polymers (a) suitable for use herein include homopolymers of a conjugated diene with at least one monomer selected from other conjugated dienes; vinyl monomer, e.g. styrene and alphamethyl styrene; olefins, e.g. ethylene, propylene, butene-1, isobutylene, hexene-1, octene-1 and dodecene-1, and mixtures thereof, having a number average molecular weight of about 150 to about 10,000 preferably about 150 to about 5,000. These homopolymers and copolymers can be produced by the methods described in, for example, U.S. Pat. Nos. 4,054, 612; 3,876,721 and 3,428,699 and include, among others, polybutadiene, polyisoprene, poly(1,3-pentadiene), poly (butadiene-isoprene), poly(styrene-butadiene), polychloroprene, poly(butadiene-alpha methylstyrene), poly(butadiene-styrene-isoprene), poly(butylene-butadiene), and the like.

Epoxy compounds (b) suitable for use in the practice of the present invention include: (1) epoxy resins produced by condensing polyhydric phenols (e.g. bisphenol-A, tetrabromobisphenol-A, resorcinol and hydroquinone) and epichlorohydrin; (2) epoxy resins produced by condensing polyhydric alcohols (e.g., ethylene glycol, propylene glycol, butylene glycol, polyethylene glycol, polypropylene glycol, pentaerythritol and trimethylolethane and the like) and epichlorohydrin, (3) glycidyletherified products of monohydric alcohols and monohydric phenols including phenyl glycidylether, butyl glycidyl ether and cresyl glycidylether; (4) glycidyl derivates of amino compounds for example, the diglycidyl derivate of aniline, (5) epoxidized products of higher olefinic or cycloalkene, or natural unsaturated oils (e.g. soybean) as well as of the foregoing liquid diene polymers; and the like.

Oxidized polyolefin waxes (c) are well known and an illustrative description thereof and processes for the production of the same are found in U.S. Pat. Nos. 3,822,227 and 3,756,999. Generally, these are prepared by an oxidation or suspension oxidation of polyolefin. An especially preferred polyolefin wax is "Hoechst Wachs".

Quinone compounds (d) suitable for use herein are characterized as having in the molecule of the unsubstituted derivative at least one six-membered carbon ring; at least two carbonyl groups in the ring structure, both of which may be in the same or, if more than one ring, different rings, provided that they occupy positions corresponding to the 1,2- or 1,4-orientation of the monocyclic quinone; and at least two carbon-carbon double bonds in the ring structure, said carbon-carbon double bounds and carbonyl carbon-oxygen double bonds in the ring structure, said carbon-carbon double bonds and carbonyl carbon-oxygen double bonds being conjugated with respect to each other. Where more than one ring is present in the unsubstituted quinone, the rings may be fused, non-fused, or both: non-fused rings may be bound by a direct carbon-carbon double bond or by a hydrocarbon radical having conjugated. unsaturation such as —C=C—C=C—.

Substituted quinones are also within the scope of the present invention. The degree of substitution; where substitution is desired, may be from one to the maximum number of replaceable hydrogen atoms. Exemplary of the various substituents that may be present on the unsubstituted quinone structures include halogen (e.g. chlorine, bromine, fluorine, etc.), hydrocarbon radicals including branched and unbranched, saturated and unsaturated alkyl, aryl, alkyl aryl and cycloalkyl radicals and halogenated derivatives thereof; and similar hydrocarbons having hetero atoms therein, particularly oxygen, sulfur, or phosphorous and wherein the same connects the radical to the quinone ring (e.g. oxygen link).

Exemplary of the various quinones there may be given 1,2- and 1,4-benzoquinone; 2,6-diphenyl quinone; tetramethyldiquinone; 2,2'- and 4,4'-diphenoquinone; 1,2-, 1,4- and 2,6-naphthoquinone; chloranils; 2-chloro- 1,4-benzoquinone; 2,6-dimethyl benzoquinone; and the like.

Organosilane compounds (e) suitable as compatibilizing agents are characterized as having in the molecule (a) at least one silicon atom bonded to a carbon through an oxygen link and (b) at least one carbon-carbon double bond or carbon-carbon triple bond and/or a functional group selected from an amine group or a mercapto group provided that the functional group is not directly bonded to the silicon atom.

In such compounds, the C—O—Si component is generally present as an alkoxyl or acetoxy group bonded directly to the silicon atom, wherein the alkoxy or acetoxy group generally has less than 15 carbon atoms and may also contain hetero atoms (e.g. oxygen).

Additionally, there may also be more than one silicon atom in the compound, such multiple silicon atoms, if present, being linked through an oxygen link (e.g. siloxanes), a silicon bond; or a bifunctional organic radical (e.g. methylene or phenylene groups); or the like.

Examples of suitable organosilane compounds include: gamma amino propyltriethoxy silane, 2-(3-cyclohexanyl) ethyl trimethoxy silane; 1,3-divinyl tetraethoxy silane; vinyl tris-(2-methoxyethoxy) silane; 5-bicycloheptenyl triethoxy silane and gamma mercapto propyl trimethoxy silane.

Polyfunctional compounds (f) which may be employed as compatibilizer in the practice of the present invention are of three types. The first type of polyfunctional compounds are those having in the molecule both (a) a carbon-carbon double bond or a carbon-carbon triple bond and b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g. acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30); unsaturated amines resulting from replacing the —OH group(s) of the above unsaturated alcohols with $NH_2$ groups; and functionalized diene polymers and copolymers; and the like. Of these, two of the preferred compatibilizing agents for compositions of the present invention are maleic anhydride and fumaric acid.

The second group of polyfunctional compatibilizer compounds suitable for use herein are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and various salts thereof. Typical of this group of compatibilizers are the aliphatic polycarboxylic acids, acid esters and acid amides represented by the formula: $(RIO)_mR(COORII)_n(CONRIIIRIV)_s$ wherein R is a linear or branched chain, saturated aliphatic hydrocarbon of from 2 to 20, preferably 2 to 10, carbon atoms; $R^I$ is hydrogen or an alkyl, aryl, acyl or carbonyl dioxy group of 1 to 10, preferably 1 to 6, most preferably 1 to 4, carbon atoms, especially preferred is hydrogen; each $R^{II}$ is independently hydrogen or an alkyl or aryl group from 1 to 20 carbon atoms, preferably from 1 to 10 carbon atoms; each $R^{III}$ and $R^{IV}$ are independently hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Suitable polycarboxylic acids include, for example, citric acid, malic acid, agaricic acid, and the like; including the various commercial forms thereof, such as for example, the anhydrous and hydrated acids. Of these, citric acid is another of the preferred compatibilizing agents. Illustrative of esters useful herein include, for example, acetyl citrate and mono- and/or distearyl citrates and the like. Suitable amides useful herein include, for example, N,N'-diethyl citric acid amide; N-phenyl citric acid amide; N-dodecyl citric acid amide; N,N'-didodecyl citric acid amide and N-dodecyl malic acid present invention. Especially preferred derivates are the salts thereof including the salts with amines and/preferably, the alkali and alkaline metal salts. Exemplary of suitable salts include calcium malate, calcium citrate, potassium malate, and potassium citrate.

The third group of polyfunctional compatibilizer compounds suitable for use herein are characterized as having in the molecule both (a) an acid halide group, most preferably an acid chloride group and (b) at least one carboxylic acid, anhydride, ester, epoxy, orthoester, or amide group, preferably a carboxylic acid or anhydride group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. Among these, trimellitic anhydride acid chloride is preferred. Furthermore, it is especially preferred that compatibilizers of this group be prereacted with at least a portion of the polyphenylene ether whereby the compatibilizing agent is a polyphenylene ether-functionalized compound.

The foregoing compatibilizing agents are more fully described in U.S. Pat. Nos. 4,315,086; 4,600,741; 4,642,358; 4,826,933; 4,927,894; 4,980,424; 5,041,504; and 5,115,042.

The foregoing compatibilizing agents may be used alone or in various combinations of one another with another. Furthermore, they may be added directly to the melt blend or pre-reacted with either or both the polyphenylene ether and polyamide, as well as with other resinous materials employed in the preparation of the compositions of the present invention. With many of the foregoing compatibilizing agents, particularly the polyfunctional compounds, even greater improvement in compatibility is found where at least a portion of the compatibilizing agent is pre-reacted, either in the melt or in a solution of a suitable solvent, with all or a part of the polyphenylene ether. It is believed that such pre-reacting may cause the compatibilizing agent to react with the polymer and, consequently, functionalize the polyphenylene ether as noted above. For example, the polyphenylene ether may be pre-reacted with maleic anhydride to form an anhydride functionalized polyphenylene ether which has improved compatibility with the polyamide compared to a non-functionalized polyphenylene ether.

Where the compatibilizing agent is employed in the preparation of the compositions of the present invention, the initial amount used will be dependent upon the specific compatibilizing agent chosen and the specific polymeric system to which it is added.

It is possible to use in the composition according to the invention any other known compatibilization system. Other systems have been described for example in U.S. Pat. No. 4,866,114.

Impact Modifiers

All impact modifiers as generally used for compositions comprising a polyphenylene ether, a polyamide or a combination of a polyphenylene ether and a polyamide can be used, typically in an amount up to about 50%, with amounts of from 0 to about 20% preferred based on the total weight of the composition. Particularly suitable are the so called block copolymers, for example, A-B-A triblock copolymers and A-B diblock copolymers. The A-B and A-B-A type block copolymer rubber additives which may be used are thermoplastic rubbers comprised of one or two alkenyl aromatic blocks which are typically styrene blocks and a rubber block, e.g., a butadiene block which may be partially hydrogenated. Mixtures of these triblock copolymers and diblock copolymers are especially useful.

Suitable A-B and A-B-A type block copolymers are disclosed in, for example, U.S. Pat. Nos. 3,078,254, 3,402,159, 3,297,793, 3,265,765, and 3,594,452 and U.K. Patent 1,264,741. Examples of typical species of A-B and A-B-A block copolymers include polystyrene-polybutadiene (SBR), polystyrene-poly(ethylene-propylene), polystyrene-polyisoprene, poly(Î±-methylstyrene)-polybutadiene, polystyrene-polybutadiene-polystyrene (SBR), polystyrene-poly(ethylene-propylene)-polystyrene, polystyrene-polyisoprene-polystyrene and poly(Î±-methylstyrene)-polybutadiene-poly(Î±-methylstyrene), as well as the selectively hydrogenated versions thereof, and the like. Mixtures of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the tradename VECTOR, and Kuraray under the trademark SEPTON.

A useful amount of impact modifier is up to about 20 weight percent (wt %), with about 1 wt % to about 15 wt % preferred, and about 2 wt % to about 10 wt % especially preferred, wherein the weight percentages are based on the entire weight of the composition.

Additives

Compositions of the present invention can also include effective amounts of at least one additive selected from anti-oxidants, flame retardants, drip retardants, dyes, pigments, colorants, stabilizers, antistatic agents, plasticizers, lubricants, and mixtures thereof. These additives are known in the art, as are their effective levels and methods of incorporation. Effective amounts of the additives vary widely, but they are usually present in an amount up to about 50 wt % or more, based on the weight of the entire composition. Especially preferred additives include hindered phenols, thio compounds and amides derived from various fatty acids. The preferred amounts of these additives generally ranges up to about 2 wt % total combined weight based on the total weight of the composition.

Preparation

The preparation of the thermoplastic compositions can normally be achieved by merely blending the ingredients under conditions for the formation of an intimate blend. Such conditions often include mixing in single or twin screw type extruders or similar mixing devices which can apply a shear to the components.

All of the ingredients may be added initially to the processing system, or else certain additives may be precompounded with one or more of the primary components, preferably the polyphenylene ether, impact modifier and the polyamide. A masterbatch of talc can be made with polyamide, at a ratio of about 5 wt % to 50 wt % talc, balance polyamide possible, with a ratio of about 40% to about 50% talc, balance polyamide preferred. Similarly, fibrils are also preferably part of a masterbatch with polyamide. The fibril ratio can be about 10% to about 30% fibrils, with about 15% to about 25% fibrils, balance polyamide preferred. The level of filler in a masterbatch is usually limited by a number of factors like, wetting behavior of filler by carrier polymer, viscosity increase of carrier polymer due to filler loading, etc.

For example, the thermoplastic composition can be made by compounding polyphenylene ether and a compatibilizer in an extruder, while maintaining the extruder at a sufficient temperature to melt the polyphenylene ether. The polyamide, a carbonmasterbatch, and optionally the talc (or a filler) masterbatch can then be introduced to the extruder at a downstream port. The compounded mixture, polyamide, carbon masterbatch and talc masterbatch are then mixed to form the thermoplastic composition. The composition can be formed into pellets, sheets, film, coating, various components, or the like.

Alternatively, the polyphenylene ether, compatibilizer and talc can be added to the extruder with a portion of the polyamide (e.g. up to about 10 wt % of the polyamide). These components can then be compounded prior to introducing the remainder of the polyamide and a carbon/polyamide masterbatch. Again, the compounded mixture, polyamide, and carbon masterbatch can then be mixed to form the thermoplastic composition.

It appears that certain properties, such as impact strength and elongation, are sometimes enhanced by initially pre-compounding the polyphenylene ether and impact modifier, optionally with any other ingredients, prior to compounding with the polyamide resin, however, these improvements are done at the expense of increasing the viscosity of the compatibilized composition. It is preferable that at least about 5 wt %, preferably at least about 8 wt %, and most preferably at least about 10 wt % polyamide be added with the polyphenylene ether and non-polymeric carboxylic acid. The remaining portion of the polyamide is fed through a port downstream. In this manner, the viscosity of the compatibilized composition is reduced without significant reduction in other key physical properties.

While separate extruders may be used in the processing, these compositions are preferably prepared by using a single extruder having multiple feed ports along its length to accommodate the addition of the various components. It is often advantageous to apply a vacuum or atmospheric pressure to the melt through at least one or more vent ports in the extruder to remove volatile impurities in the composition. Those of ordinary skill in the art will be able to adjust blending times and temperatures, as well as component addition, without undue additional experimentation.

It should be clear that the reaction products, compositions and articles made from the compositions made by the method of this disclosure are within the scope of the invention.

All patents cited are incorporated herein by reference.

The invention will be further described by the following examples which are meant to be illustrative, not limiting.

EXAMPLES

Thermoplastic compositions A through I comprising the compositions set forth in the Table were prepared as follows:

Pre-mixes of 45 wt % talc Finntalc M15 from SA Omya Benelux NV, Bruss Belgium and 55 wt % low IV polyamide (masterbatch talc/low IV PA) (i.e. w viscosity, according ISO 307, between 123–129 ml/g); and 20 wt % carbon fibrils (BN fibrils as produced by Hyperion Catalysis International, Cambrid Mass. 02138, USA) and 80 wt % low IV polyamide (masterbatch carbon/low PA) were prepared.

TABLE

| Formulation (Units: parts) | A | B | C | D | E | F | G | H | I |
|---|---|---|---|---|---|---|---|---|---|
| PPE | 22.8 | 22.8 | 22.8 | 22.8 | 22.8 | 22.8 | 22.8 | 22.8 | 22.8 |
| low IV PA | 49.9 | 49.9 | 49.9 | 49.9 | 49.9 | 49.9 | 49.9 | 49.9 | 49.9 |
| SEBS**** | 6 | 6 | 6 | 6 | 6 | 6 | 6 | 6 | 6 |
| Additives* | 1.81 | 1.81 | 1.81 | 1.81 | 1.81 | 1.81 | 1.81 | 1.81 | 1.81 |
| TALC** | 19.3 | 19.3 | 19.3 | 19.3 | 19.3 | 19.3 | 19.3 | 19.3 | 19.3 |
| CCB | | | | | 1.4 | 1.6 | 1.8 | 2.0 | 2.2 |
| CF*** | 1.0 | 1.2 | 1.4 | 1.6 | | | | | |
| Properties | | | | | | | | | |
| Specific Volume Resistivity (kOhm · cm) | 26.15 | 0.616 | 0.239 | 0.153 | 15.92 | 2.88 | 2.34 | 0.8 | 0.47 |
| Melt Volume Rate (cm³/10 min.) | 22.2 | 18.2 | 16.1 | 14.2 | 17.7 | 13.5 | 12.9 | 9.4 | 8.1 |
| Melt Viscosity (Pa · s) | 145 | 142 | 144 | 150 | 185 | 192 | 190 | 198 | 188 |
| Unnotched Izod Impact (kJ/m²) | 39 | 35 | 38 | 34 | 38 | 37 | 39 | 33 | 27 |

*additives: 0.7 citric acid; 0.1 KI/H$_2$O (50/50 wt %); 0.01 copper iodide; 1.0 mineral oil
**Talc: masterbatch talc/low IV PA (45/55 wt %)
***CF: masterbatch carbon fibrils/low LV PA (20/80 wt %)
****SEBS: styrene ethylene butylene styrene.

Materials have been produced on a Werner & Pfleiderer 28 extruder were, for formulations A–D polyphenylene ether, compatibilizer, impact modifier, flow promoter and stabilizers were fed via the first part of the extruder and the masterbatches (talc/PA & fibrils/PA) as well as PA were fed in a down stream feedport located on approximately ⅓ of the extruder. For formulations E–I same procedure was done, except for the CCB which was fed in a down stream feedport located on approximately ⅔ of the extruder. Temperature settings of the machine: 260–300–305-305-305–290–295–305-305–300–310Â° C. Melt temperature approximately 335Â° C., throughout rate 12 kg/hr, screw speed 300 rpm.

The properties were determined using ISO 1133 for melt volume rate (MVR) at (280Â° C./50 Newtons (N)); ISO 11443, 282Â° C./1,500 seconds$^{-1}$ (s) for melt viscosity (MV); and ISO 180 for unnotched Izod impact.

The specific volume resistivity was determined using a Netstal 60 molding machine having a screw diameter of 32 millimeters (mm), using a 285Â° C. (Â±5Â° C.) processing temperature, a mold temperature of 100Â° C. (Â±5Â° C.), a mass injection press I of 1,600 (Â±100) bar, a mass injection press II of 1,350 (Â±100) bar, an injection speed of 3.0 (Â±5) centimeters per second (cm/s), a cooling time of 25 (Â±2) seconds, and a total cycle time of 41 (Â±5) seconds. The tensile bar (ISO 3167) was notched with a razor blade on both ends of the narrow parallel portion. After the two adjacent sections were then broken in a brittle fashion, both fracture surfaces were painted with silver paint which was allowed to dry for at least 0.5 hours. The resistance was measured using a multimeter, and, using the dimensions of the part, the specific volume resistivity (SPV) was determined according to: $SPV=(resistance\ measured)(width)(height/length)$.

As can be seen from Blends A–D versus E–I, a substantial reduction in melt viscosity was achieved employing the carbon fibrils and the talc. Blends A–D attained a significantly lower melt viscosity, about 150 PaÂ•s or less, while Blends E–I possessed melt viscosities exceeding 180 PaÂ•s.

Surprisingly it was discovered that for the same conductivity range a composition made using a carbon fibril masterbatch did show a significant improvement in flow performance over a conductive carbon black composition without showing any significant difference in impact performance. Consequently, since the thermoplastic composition of the present invention advantageously effects flow, it can be employed to produce thinner parts (i.e. in thinner applications) and/or produce larger parts having a thickness comparable to conventional parts having a polyphenylene ether/polyamide composition. This invention is particularly useful in producing electrostatically paintable components, such as automotive parts and the like.

The invention claimed is:

1. A method of manufacturing a thermoplastic resin composition comprising:
   melt blending a first mixture comprising a polyphenylene ether, and a compatibilizing agent to form a first melt mixture;
   adding a first polyamide, a carbon fibril masterbatch and a filler masterbatch to the first melt mixture and melt mixing to form a second melt mixture wherein the second melt mixture comprises based on the total weight of the second melt mixture, about 10 to about 50 wt % of the polyphenylene ether, about 35 to about 65 wt % of the polyamide, and about 0.4 to about 3 wt % of thin carbon fibrils.

2. The method of claim 1 wherein the carbon fibril masterbatch comprises carbon fibrils and a second polyamide.

3. The method of claim 2 wherein the second polyamide is a low viscosity polyamide.

4. The method of claim 1 wherein the first mixture further comprises an impact modifier.

5. A method for manufacturing a thermoplastic resin composition comprising:
   melt blending a first mixture comprising a polyphenylene ether, an impact modifier, and a compatibilizing agent to form a first melt mixture;
   adding a first polyamide, carbon fibril masterbatch and a filler masterbatch to the first melt mixture and melt mixing to form a second melt mixture wherein the second melt mixture comprises, based on the total weight of the second molt mixture, about 10 to about 50 wt % of the polyphenylene ether, about 35 to about 65 wt % of the polyamide, about 0.4 to about 3 wt % of the carbon fibrils and about 1 to about 15 wt % of the impact modifier.

6. The method according to claim 2, wherein the carbon fibrils and the second polyamide are present in the masterbatch in a ratio of about 10 to about 30 wt. % of the carbon fibrils to about 90 to about 70 wt. % of the second polyamide.

7. The method according to claim 6, wherein the ratio is about 15 to about 25 wt. % of the carbon fibrils to about 85 to about 75 wt. % of the second polyamide.

8. The method according to claim 1, wherein the first polyamide has a viscosity of about 90 ml/g to about 350 ml/g, as measured in a 0.5 wt % solution in 96 wt % sulphuric acid in accordance with ISO 307.

9. The method according to claim 1, wherein the filler masterbatch comprises talc and a third polyamide.

10. The method according to claim 9, wherein the talc and the third polyamide are present in the masterbatch in a ratio of about 5 to about 50 wt. % of the talc to about 95 to about 50 wt. % of the third polyamide.

11. The method according to claim 1, wherein the polyphenylene ether has an intrinsic viscosity of about 0.1 dl/g to about 0.60 dl/g, as measured in chloroform at 25 20 C.

12. The method according to claim 1, wherein the compatibilizing agent is selected from the group consisting of liquid diene polymers, epoxy compounds, oxidized polyolefin wax, quinones, organosilane compounds, polyfunctional compounds, and combinations comprising at least one of the foregoing.

13. The method according to claim 4, wherein the impact modifier is selected from the group consisting of A-B diblock copolymers, A-B-A triblock copolymers, partially hydrogenated A-B diblock copolymers, partially hydrogenated A-B-A triblock copolymers, selectively hydrogenated A-B diblock copolymers, selectively hydrogenated A-B-A triblock copolymers, and combinations comprising at least one of the foregoing.

14. The method according to claim 1, wherein the first mixture further comprises additives.

15. The method according to claim 1, wherein the polyphenylene ether comprises two polyphenylene ether components having different intrinsic viscosities.

16. The method according to claim 5, wherein the carbon fibril masterbatch comprises about 10 to about 30 wt. % of the carbon fibrils and about 90 to about 70 wt. % of a second polyamide.

17. The method according to claim 16, wherein the carbon fibril masterbatch comprises about 15 to about 25 wt. % of the carbon fibrils and about 85 to about 75 wt. % of the second polyamide.

18. The method according to claim 5, wherein the filler masterbatch comprises about 5 to about 50 wt. % of talc and about 95 to about 50 wt. % of a third polyamide.

19. The method according to claim 5, wherein the impact modifier is selected from the group consisting of A-B diblock copolymers, A-B-A triblock copolymers, partially hydrogenated A-B diblock copolymers, partially hydrogenated A-B-A triblock copolymers, selectively hydrogenated A-B diblock copolymers, selectively hydrogenated A-B-A triblock copolymers, and combinations comprising at least one of the foregoing.

20. The method according to claim 5, wherein the first mixture further comprises additives.

21. The method according to claim 5, wherein the polyphenylene ether comprises two polyphenylene ether components having different intrinsic viscosities.

22. The method according to claim 1 wherein the polyphenylene ether comprises a copolymer derived from copolymerization fo 2,6-dimethylphenol with 2,3,6-trimethylphenol.

23. method according to claim 5 wherein the polyphenylene ether comprises a copolymer derived from copolymerization fo 2,6-dimethylphenol with 2,3,6-trimethylphenol.

24. The method of claim 16, wherein the second polyamide is a low viscosity polyamide.

25. The method of claim 18, wherein the third polyamide is a low viscosity polyamide.

* * * * *

UNITED STATES PATENT AND TRADEMARK OFFICE
CERTIFICATE OF CORRECTION

PATENT NO.       : 7,226,963 B2
APPLICATION NO.  : 10/249929
DATED            : June 5, 2007
INVENTOR(S)      : Christiaan Koevoets It is certified that error appears in the above-identified patent and that said Letters Patent is hereby corrected as shown below:

Column 1:
Line 45, after "35" delete "1¼" and insert therefor --$\mu$--;

Line 50, after "35" delete "1¼" and insert therefor --$\mu$--;

Column 3:
Line 27, after "25", delete "Â";
Line 31, after "used", delete "Will" and insert therefor --will--;

Column 6:
Line 28, after "conjugated", delete ".";

Column 9:
Line 9, after "poly(" delete "α" and insert therefor --$\alpha$--;
Line 12, after "poly(" delete "α" and insert therefor --$\alpha$--;
Line 13, after "poly(" delete "α" and insert therefor --$\alpha$--;

Column 10:
Line 5, before "and", delete "carbonmasterbatch" and insert therefor --carbon masterbatch--;
Line 62, before "Belgium", delete "Bruss" and insert therefor --Brussels,--;
Line 66, before "Mass", delete "Cambrid" and insert therefor --Cambridge,--;

Column 11:
Line 36, after "310", delete "Â";
Line 37, after "335", delete "Â";
Line 40, after "280", delete "Â";
Line 41, after "282", delete "Â";
Line 45, after "285", delete "Â";
Line 45, before "°C" (2nd occurrence), delete "Â±5Â" and insert therefor --±5--;
Line 46, after "100", delete "Â";
Line 46, before "°C" (2nd occurrence), delete "Â±5Â" and insert therefor --±5--;
Line 47, before "±100", delete "Â";
Line 48, before "±100", delete "Â";
Line 49, before "±5", delete "Â";
Line 50, before "±5", delete "Â";
Line 50, before "±2", delete "Â";
Line 63, after "Pa", delete "Â";
Line 64, after "Pa", delete "Â";

UNITED STATES PATENT AND TRADEMARK OFFICE
CERTIFICATE OF CORRECTION

PATENT NO. : 7,226,963 B2
APPLICATION NO. : 10/249929
DATED : June 5, 2007
INVENTOR(S) : Christiaan Koevoets It is certified that error appears in the above-identified patent and that said Letters Patent is hereby corrected as shown below:

Column 13:
Line 1, after "second", delete "molt" and insert therefor --melt--;
Line 26, after "25", delete "20" and insert therefor --°--.

Signed and Sealed this

First Day of July, 2008

JON W. DUDAS
*Director of the United States Patent and Trademark Office*